(12) United States Patent
Eskew et al.

(10) Patent No.: US 6,173,967 B1
(45) Date of Patent: Jan. 16, 2001

(54) GASKETS FOR FLUID CONDUITS

(75) Inventors: Samuel W. Eskew, Batavia; William L. Kane, Somonauk, both of IL (US)

(73) Assignee: Cascade Waterworks Manufacturing Co., Inc., Yorkville, IL (US)

( * ) Notice: Under 35 U.S.C. 154(b), the term of this patent shall be extended for 0 days.

(21) Appl. No.: 09/149,382

(22) Filed: Sep. 8, 1998

(51) Int. Cl.$^7$ ........................................... F16L 11/12
(52) U.S. Cl. .................. 277/606; 277/606; 277/626; 277/651
(58) Field of Search ..................... 277/606, 626, 277/651, 627, 612, 640, 649, 647, 609; 285/197, 110, 111

(56) References Cited

U.S. PATENT DOCUMENTS

| | | |
|---|---|---|
| 873,689 | 12/1907 | Van Winkle . |
| 3,204,665 | 9/1965 | Faint ........................................ 138/99 |
| 3,471,176 | 10/1969 | Gilchrist ............................... 285/111 |
| 3,840,255 | 10/1974 | Daghe ..................................... 285/45 |
| 4,018,464 | 4/1977 | Acda et al. ........................... 285/197 |
| 4,059,291 | 11/1977 | Acda et al. ........................... 285/197 |
| 4,350,371 | 9/1982 | Lochte et al. .......................... 285/18 |
| 4,368,894 | * 1/1983 | Parmann ............................... 277/651 |
| 4,664,428 | 5/1987 | Bridges ................................ 285/373 |
| 4,708,373 | 11/1987 | Morriss, Jr. ........................... 285/156 |
| 4,895,397 | 1/1990 | Miller ................................... 285/419 |
| 5,040,828 | 8/1991 | Kane ..................................... 285/197 |
| 5,806,896 | * 9/1998 | Sato et al. ............................. 285/197 |

* cited by examiner

*Primary Examiner*—Anthony Knight
*Assistant Examiner*—Enoch E. Peavey
(74) *Attorney, Agent, or Firm*—Emrich & Dithmar

(57) ABSTRACT

A branch gasket for a tapping sleeve is disposed about the side branch aperture in a main fluid conduit and between and in sealed contact with the main fluid conduit and an outer sleeve connected to the side branch. The branch gasket is comprised of a flexible, compressible, resilient material and includes a hydraulic lip, a stainless steel insert ring, a first pair of inner O-ring seals in intimate contact with the main fluid conduit, and a second pair of outer O-ring seals in intimate contact with the outer sleeve. A mat gasket for use with a tapping saddle is disposed about an aperture in a main fluid conduit and is further disposed between and in sealed contact with the main fluid conduit and an outer sleeve member. The mat gasket includes an aperture aligned with the aperture in the main fluid conduit and outer and inner portions in sealed contact with the outer sleeve member and the main fluid conduit, respectively. The mat gasket's inner portion is provided with a waffled surface and includes spaced ribs concentrically disposed about and in closely spaced relation to the aperture in the gasket and a pair of opposed, tapered edges. The mat gasket's outer portion is provided with a pair of concentric O-rings disposed about the gasket's aperture for engaging the outer sleeve member in a sealed manner.

6 Claims, 3 Drawing Sheets

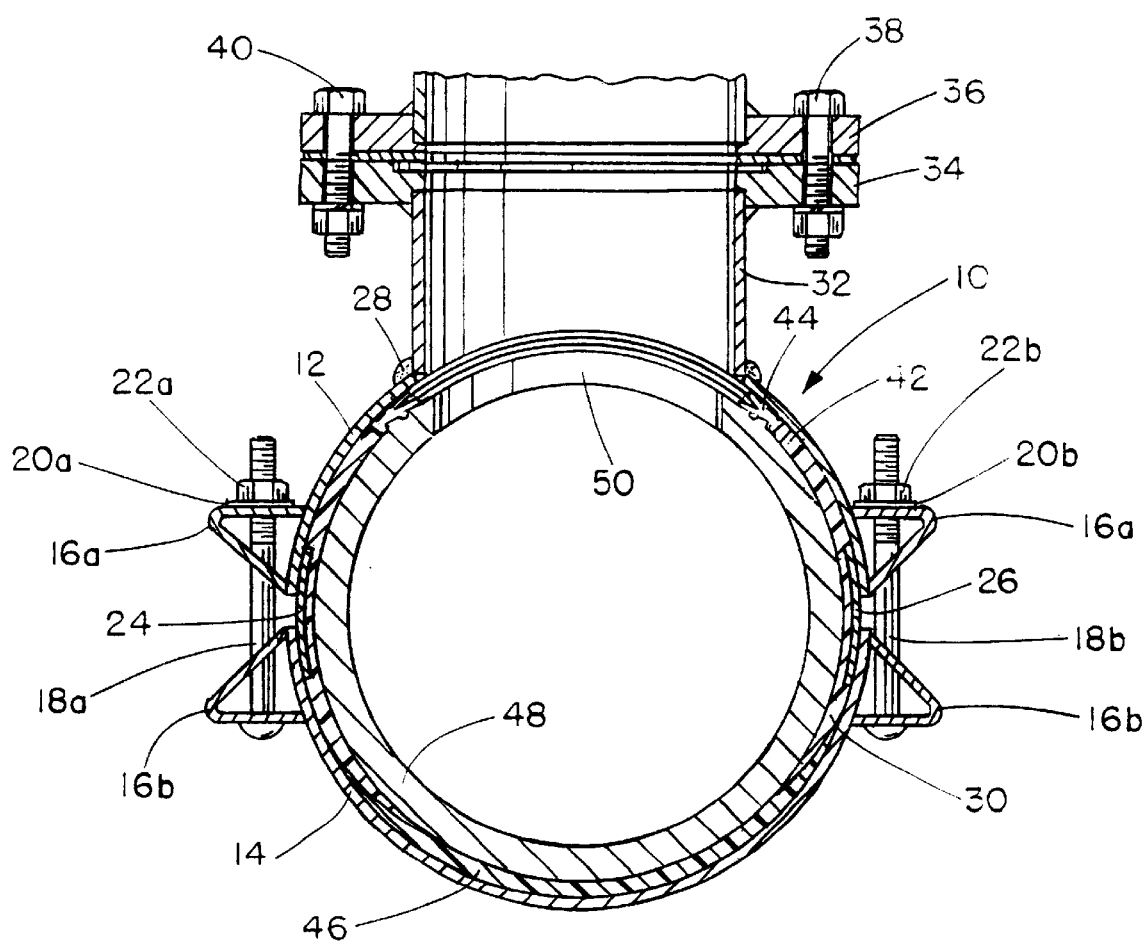
FIG. 1
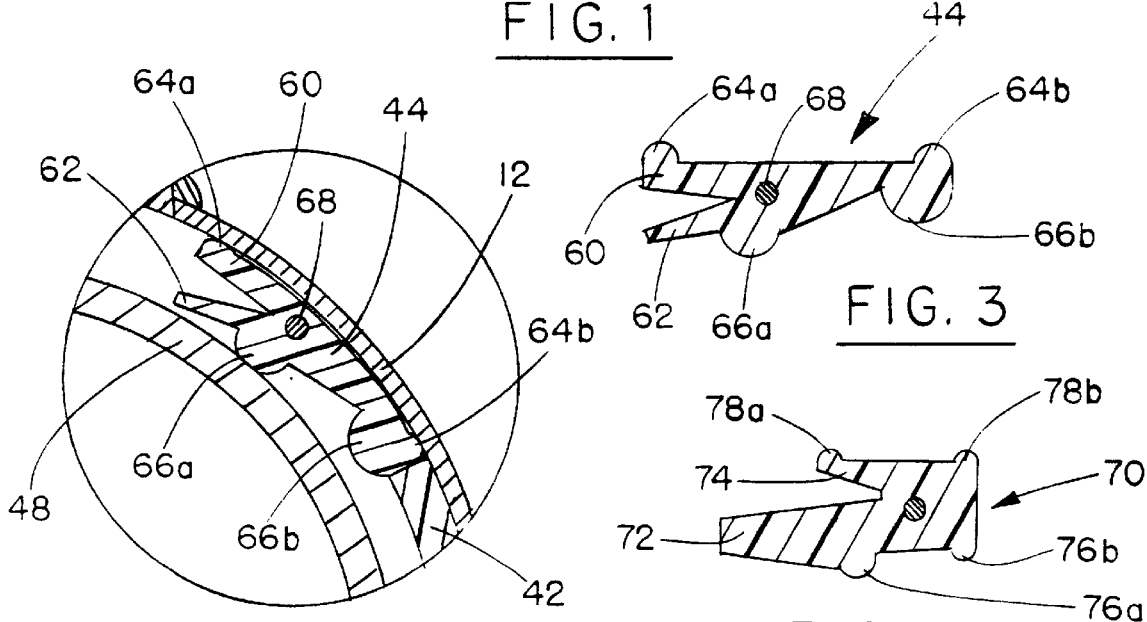
FIG. 2
FIG. 3
FIG. 4

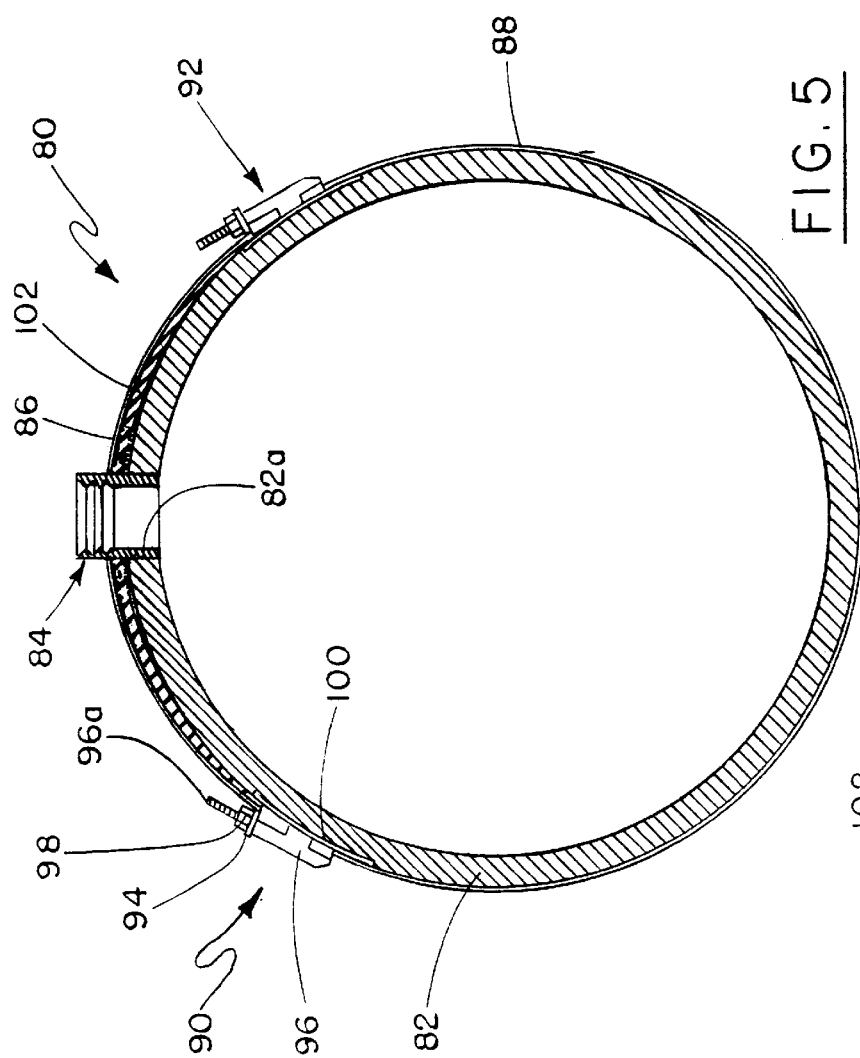
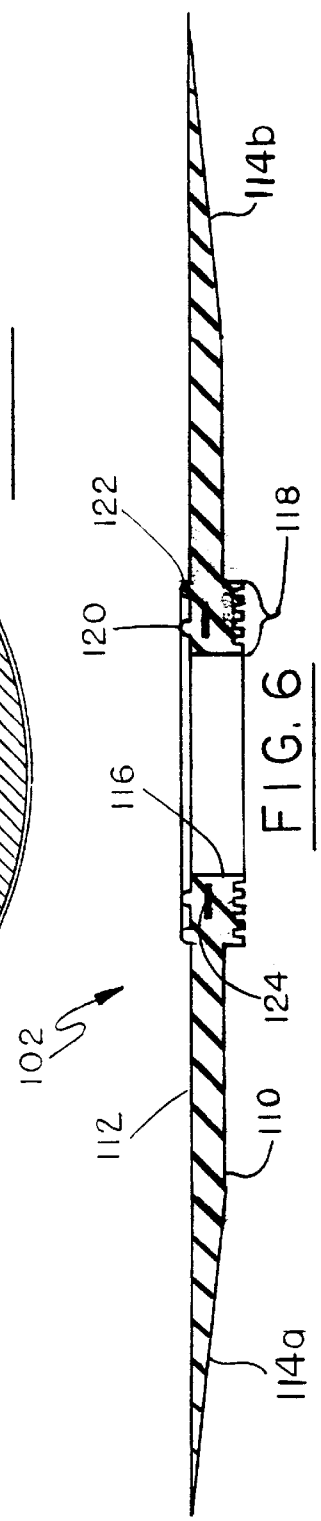

GASKETS FOR FLUID CONDUITS

FIELD OF THE INVENTION

This invention relates generally to sealed connections for fluid conduits and is particularly directed to gaskets for connecting a tapping sleeve or branch to a fluid conduit in a sealed manner.

BACKGROUND OF THE INVENTION

Tapping saddles are used in fluid bearing conduits to support an extension pipe positioned in close proximity to and in alignment with a hole tapped in a main supply conduit. The tapping sleeve is typically provided in two sections adapted for attachment to the main supply conduit, with one sleeve section including the extension pipe, or side branching outlet. The outer sleeve sections are disposed around the main conduit and are secured together by means of bolts or welded-on studs. Various gasket arrangements are disposed between the two tapping saddle sleeves and the main conduit about the side opening in the conduit. The inner and outer surfaces of these types of gaskets are typically provided with an O-ring concentrically disposed adjacent to and about the aperture in the main conduit for providing a seal between the tapping saddle sleeves and the main conduit. These types of gasket arrangements have offered only limited sealing capability in prevent leaks in the tapping saddle installation. Examples of tapping saddle arrangements can be found in U.S. Pat. Nos. 873,689; 3,471,176; 3,840,255; 4,018,464; 4,059,291; 4,350,371; 4,708,373; 4,895,397; and 5,040,828.

The present invention addresses the aforementioned limitations of the prior art by providing a branch gasket for a tapping sleeve or saddle in a fluid conduit which includes a hydraulic lip, a steel ring reinforcing insert and a double O-ring seal on its inner and outer surfaces. This invention further contemplates a mat gasket for a tapping saddle having a steel ring reinforcing insert, a concentric rib seal on its inner surface, and a double O-ring seal on its outer surface.

OBJECTS AND SUMMARY OF THE INVENTION

Accordingly, it is the object of the present invention to provide an improved branch gasket for a tapping sleeve of a fluid conduit.

It is another object of the present invention to provide a branch gasket for a fluid conduit which includes a hydraulic lip, a steel ring reinforcing insert, and a double O-ring seal on its inner and outer surfaces.

Yet another object of the present invention is to provide an improved tapping saddle of a fluid conduit having a mat gasket including a steel ring reinforcing insert, a concentric rib seal on its inner surface, and a double O-ring seal on its outer surface.

This invention contemplates a branch gasket disposed between a main conduit and a tapping sleeve disposed about the main conduit, wherein the branch gasket is further disposed about a side opening in the main conduit and the tapping sleeve includes a side branch disposed adjacent to and aligned with the side opening, the branch gasket comprising a generally circular compressible, resilient member having an aperture disposed about the side opening in the main conduit and further including a first inner portion in contact with the main conduit and a second outer portion in contact with the tapping sleeve; a hydraulic lip disposed on a first inner edge of the compressible, resilient member in facing relation to the side opening in the main conduit; a first pair of concentrically spaced O-rings disposed on the first outer portion of the compressible, resilient member about the aperture therein for engaging the tapping sleeve in a sealed manner; and a second pair of concentrically spaced O-rings disposed on the second inner portion of the compressible, resilient member about the aperture therein for engaging and forming a double seal with the main conduit.

This invention further contemplates a mat gasket for a tapping saddle disposed between an outer shell and an inner main conduit and further disposed about aligned apertures in the outer shell and the inner main conduit, the mat gasket comprising a flexible, compressible, resilient member having first outer and second inner opposed surfaces and an aperture therein, wherein the first outer surface engages the outer shell and the second inner surface engages the inner main conduit about the respective aligned apertures therein; a pair of concentric O-rings disposed on the first outer surface of the flexible, compressible, resilient member about and adjacent to the aperture therein, wherein said pair of concentric O-rings engage and form a double seal with the outer shell; and a generally circular ribbed portion disposed on the second inner surface of the flexible, compressible, resilient member about and adjacent to the aperture therein, wherein said generally circular ribbed portion engages and forms a seal with the inner main conduit.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawing, where like reference characters identify like elements throughout the various figures, in which:

FIG. 1 is a sectional view of a tapping sleeve for a fluid conduit incorporating a branch gasket (accordance with the principles of the present invention;

FIG. 2 is an enlarged portion of FIG. 1 showing additional details of the inventive branch gasket disposed between the tapping sleeve's top shell and the main fluid conduit;

FIG. 3 is a lateral sectional view of one embodiment of the inventive branch gasket;

FIG. 4 is a lateral sectional view of another embodiment of a branch gasket in accordance with the principles of the present invention;

FIG. 5 is a sectional view of a tapping saddle arrangement incorporating a mat gasket in accordance with the present invention;

FIG. 6 is a sectional view of the inventive mat gasket;

DETAILED DESCRIPTION OF THE PREFERRED EMBODIMENTS

Figure 7:
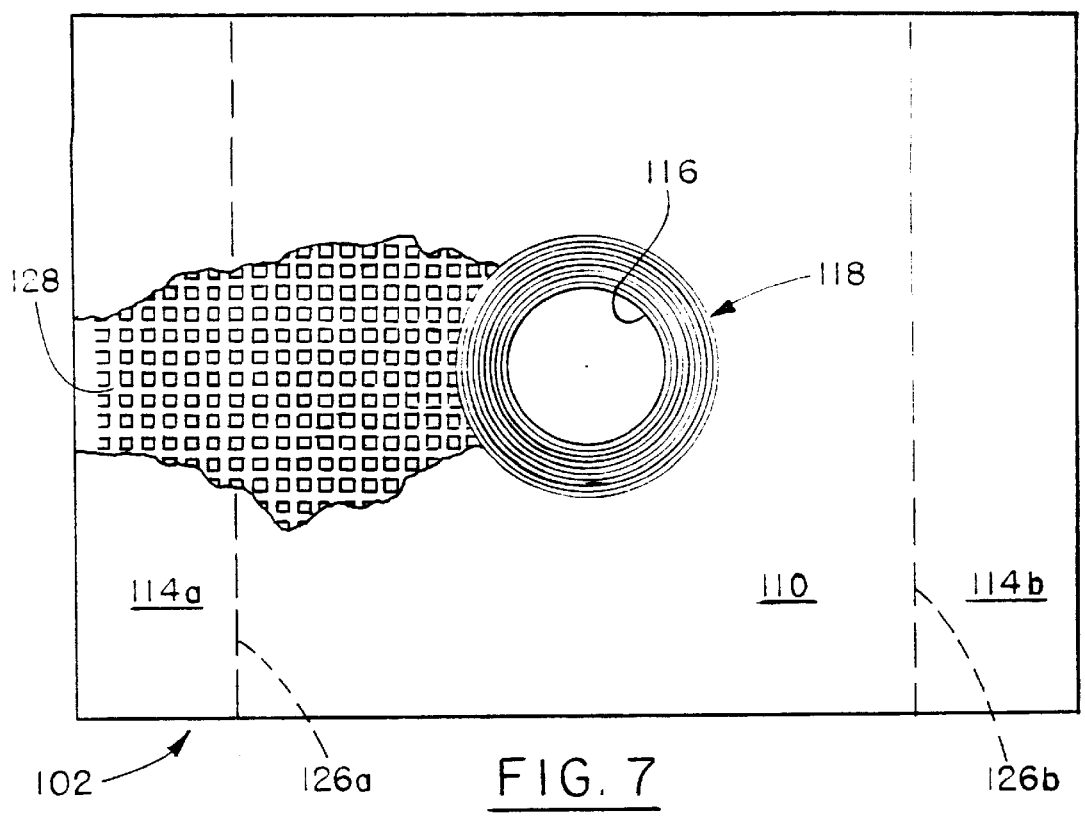
FIG. 7 is a plan view of the inner portion of the mat gasket shown in FIG. 6.

Referring to FIG. 1, there is shown a sectional view of a tapping sleeve 10 for a main fluid conduit 48 incorporating a branch gasket 44 in accordance with the principles of the present invention. FIG. 2 is an enlarged portion of the sectional view of FIG. 1 showing additional details of the inventive branch gasket 44 disposed between the tapping sleeve's top shell 12 and the main fluid conduit 48. FIG. 3 is a lateral sectional view of the inventive branch gasket 44.

Tapping sleeve 10 is adapted for tight fitting positioning about the main fluid conduit 48. Tapping sleeve 10 includes the aforementioned top shell, or upper sleeve member, 12 in combination with a bottom shell, or lower sleeve member, 14. The top and bottom shells 12, 14 are securely connected by means of a plurality of nut and bolt combinations. More specifically, upper bolt lug members 16a are attached to opposed outer portions of the top shell 12. Similarly, lower bolt lug members 16b are attached to opposed outer portions of the bottom shell 14. Bolts 18a and 18b in combination with nuts 22a and 22b and washers 20a and 20b securely connect adjacent upper and lower lug members 16a and 16b. Lug members 16a and 16b are elongated, extending along the respective lengths of the top and bottom shells 12,14, and typically accommodate a plurality of nut and bolt combinations along their respective lengths, although only a pair of nut and bolt combinations are shown in the figure for simplicity. Disposed between and engaging the outer surface of the main fluid conduit 48 and the inner surface of the bottom shell 14 is a lower shell gasket 46. Similarly, a mat gasket 42 is disposed between the main fluid conduit 48 and portions of the top shell 12 and bottom shell 14. Gaps, or spaces, between adjacent lateral portions of the top and bottom shells 12,14 are covered by first and second metal plates 24 and 26 disposed between the inner surfaces of adjacent portions of the top and bottom shells and an outer surface of the mat gasket 42. Top and bottom shells 12,14 as well as the bolt lug members 16a,16b are preferably comprised of a high strength, corrosion resistant material, such as stainless steel. Mat gasket 42 and lower shell gasket 46 are preferably comprised of a flexible, resilient, compressible material such as styrene butadiene rubber.

Disposed in an upper portion of the main fluid conduit 48 is a side opening 50 in the form of a circular aperture. Disposed adjacent to and aligned with the side opening 50 is a side branch 32 which is affixed to an upper portion of the top shell 12 about the aperture therein by means of a weldment 28. Side branch 32 includes first and second flanges 34 and 36 securely coupled together by conventional means such as a plurality of nut and bolt combinations 38 and 40. Side branch 32 allows a portion of a fluid in the main fluid conduit 48 to be removed from the main fluid conduit and directed elsewhere.

In accordance with the present invention, an inventive branch gasket 44 is disposed between and in sealed contact with the top shell 12 and main fluid conduit 48 and is further disposed about the aperture 50 in the main fluid conduit. An enlarged sectional view of the inventive branch gasket 44 shown in position in the tapping sleeve 10 is illustrated in FIG. 2. A lateral sectional view of the inventive branch gasket 44 is shown in FIG. 3. Disposed about and engaging the branch gasket 44 is the aforementioned mat gasket 42. Mat gasket 42 maintains the branch gasket 44 in position about the aperture 50 in the main fluid conduit 48 and also forms a back-up seal for the branch gasket in the event of a leak in the branch gasket. Branch gasket 44 is preferably comprised of a resilient, compressible material such as styrene butadiene rubber and includes a hydraulic lip comprised of first and second adjacent flanges 60 and 62. When fluid flows from the main fluid conduit 48 into the side branch 32, fluid pressure is applied to the first and second flanges 60,62 forcing the two flanges apart. With fluid pressure applied to the branch gasket 44, the gasket's first flange 60 securely engages the inner surface of the top shell 12, while the second flange 62 securely engages the outer surface of the main fluid conduit 48. The first and second flanges 60,62 thus form a first seal between the top shell 12 and the main fluid conduit 48. Disposed on the outer surface of the branch gasket 44 in a spaced manner are first and second concentrically spaced outer O-ring seals 64a and 64b. The first and second outer O-ring seals 64a,64b form second and third seals with the inner surface of the top shell 12. Similarly, the inner surface of the branch gasket 44 is provided with first and second concentrically spaced inner O-ring seals 66a and 6b. The first and second inner O-ring seals 66a,66b form second and third seals with the main fluid conduit 48. Thus, the inventive branch gasket 44 incorporating the outer and inner pair of concentric O-ring seals forms two separate seals with the outer top shell 12. Disposed within and extending the full length of the branch gasket 44 is a stainless steel ring 68. Stainless steel ring 68 substantially increases the strength of the branch gasket 44 and securely maintains the branch gasket in position about the opening 50 in the main fluid conduit 48 by preventing the branch gasket from expanding or changing its shape in response to the application of fluid pressure.

Referring to FIG. 4, there is shown a sectional view of another embodiment of a branch gasket 70 in accordance with the principles of the present invention. Branch gasket 70 is also comprised of a resilient, compressible material such as styrene butadiene rubber and also includes first and second flanges 72 and 74 forming a hydraulic lip. Disposed in a concentrically spaced manner on the branch gasket's inner surface are first and second concentrically spaced inner O-rings 76a and 76b. Similarly, disposed in a concentrically spaced manner on the branch gasket's outer surface are first and second outer O-rings 78a and 78b. Branch gasket 70 also forms three separate, spaced seals with an outer tapping sleeve shell and an inner main fluid conduit, which are not shown in the figure for simplicity. The primary difference between the branch gasket 70 shown in FIG. 4 and the branch gasket 44 shown in FIG. 3 is the relative lengths of the gasket's two flanges forming the gasket's hydraulic lip and the positions of O-rings 64a and 78a relative to the gasket's hydraulic lip.

Referring to FIG. 5, there is shown a sectional view of a tapping saddle 80 incorporating a mat gasket 102 in accordance with another aspect of the present invention. Tapping saddle 80 is used for incorporating a threaded tapping coupler 84 in a sealed manner in an aperture 82a in a fluid conduit 82. Tapping saddle 80 includes an upper sleeve member 86 disposed about an upper portion of the fluid conduit 82 and a lower sleeve member 88 disposed about a lower portion of the fluid conduit. The upper and lower sleeve members 86,88 are securely coupled together and maintained in position about and in engagement with the fluid conduit 82 by means of first and second couplers 90 and 92. The first coupler 90 includes a coupling finger 96 attached to a receiver bar 100. Receiver bar 100 is, in turn, securely attached to an inner portion of the lower sleeve member 88. Attached to and extending from an upper portion of coupling finger 96 is a threaded stud 96a. Threaded stud 96a is adapted for insertion through an aperture in a washer plate 94 attached to the lowered edge of the upper sleeve member 86. Threaded stud 96a is maintained in position within the washer plate 94 by means of a nut 98. Tightening of nut 98 draws the upper and lower sleeve members 86,88 toward each other and also draws the upper and lower sleeve members more tightly about the fluid conduit 82. The second coupler 92 is identical in configuration and operation with the first coupler 90 as shown in FIG. 5 and a detailed description of the second coupler is thus omitted for simplicity. Sleeve members 86 and 88 are shown in FIG. 5 as disposed on upper and lower portions of fluid conduit 82, but these two sleeves may be disposed on side portions of the fluid conduit depending upon where the aperture 82a is located in the fluid conduit.

The upper sleeve member 96 as well as the mat gasket 102 each include respective aligned apertures for receiving the threaded tapping coupler 84. Tightening of the first and second couplers 90,92 not only draws the upper and lower sleeve members 86,88 toward one another, but also compresses the mat gasket 102 between the upper sleeve member and the fluid conduit 82. The configuration and operation of the mat gasket 102 as well as the manner in which the mat gasket forms a leak-proof seal between the fluid conduit 82 and upper sleeve member 86 and about the threaded tapping coupler 84 is described in detail in the following paragraphs.

Referring to FIG. 6, there is shown a sectional view of the inventive mat gasket 102. Plan views of the inner and outer portions of the inventive mat gasket 102 are respectively shown in FIGS. 7 and 8.

Figure 8:
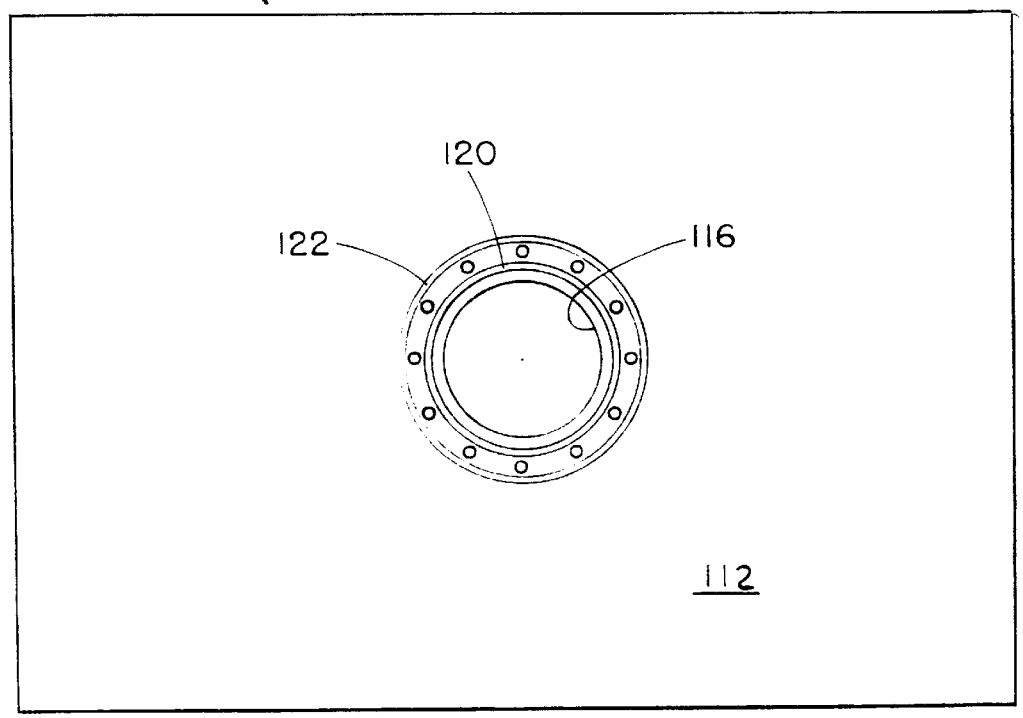
FIG. 8 is a plan view of the outer portion of the mat gasket shown in FIGS. 6 and 7.

Mat gasket 102 includes a flat inner portion, or surface, 110 and a flat outer portion, or surface, 112. Opposed, inner distal ends of the mat gasket 102 are provided with first and second tapered portions 114a and 114b. Disposed in the center of the mat gasket 102 is a circular aperture 116. Disposed about the circular aperture 116 and embedded within the mat gasket 102 is a flat stainless steel reinforcing ring 124. The inner portion of the mat gasket 102 immediately adjacent to and disposed about the aperture 116 therein is provided with a plurality of concentric, upraised ribs 118. Concentric ribs 118 engage and form a seal with the outer surface of the fluid conduit 82 immediately adjacent to and about the threaded tapping coupler 84. Disposed on the outer surface of the mat gasket 102 immediately adjacent to and about the aperture 116 therein are concentrically disposed inner and outer O-ring seals 120 and 122. The inner and outer O-ring seals 120,122 engage the inner surface of the upper sleeve member 86 immediately adjacent to and concentrically about the aperture therein to form a dual seal with the upper sleeve member. Mat gasket 102 is preferably comprised of a flexible, resilient, compressible material such as styrene butadiene rubber. Thus, when the first and second couplers 90,92 are tightened and the upper sleeve member 86 is drawn toward the fluid conduit 82, the concentric ribs 118 and inner and outer O-ring seals 120,122 become compressed and form leak-proof seals respectively with the fluid conduit and the upper sleeve member. As shown in FIG. 7, the inner portion of the mat gasket 102 is provided with a waffle-like grid pattern 128, with dotted lines 126a and 126b respectively showing where the flat inner portion 112 of the gasket ends and the first and second tapered outer portions 114a and 114b begin.

There has thus been shown a branch gasket for a tapping sleeve disposed about a side branch aperture in a main fluid conduit and between and in sealed contact with the main fluid conduit and an outer sleeve connected to the side branch. The branch gasket includes a hydraulic lip and first and second concentric O-rings disposed on each of its inner and outer surfaces. The branch gasket thus forms a triple seal with both the inner main fluid conduit and the outer tapping sleeve. There has also been shown a mat gasket for use with a tapping saddle which is disposed about an aperture in a main fluid conduit and is further disposed between and in sealed contact with the main fluid conduit and an outer sleeve member. The mat gasket includes an aperture aligned with the aperture in the main fluid conduit for receiving a tapping coupler. Concentrically disposed on the inner surface of the mat gasket about the tapping coupler are a plurality of upraised ribs for engaging the main fluid conduit in a sealed manner. Disposed on the outer surface of the mat gasket about the aperture therein are inner and outer concentrically disposed O-ring seals for providing a double seal with the outer sleeve member. The branch gasket and mat gasket are preferably comprised of a flexible, resilient, compressible elastomeric compound such as styrene butadiene rubber.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

We claim:

1. A branch gasket disposed between a main conduit and a tapping sleeve disposed about said main conduit, wherein said branch gasket is further disposed about a side opening in the main conduit and said tapping sleeve includes a side branch disposed adjacent to and aligned with said side opening, said branch gasket comprising:

a generally circular compressible, resilient member having an aperture disposed about the side opening in the main conduit and further including a first inner portion in contact with the main conduit and a second outer portion in contact with the tapping sleeve;

a hydraulic lip disposed on a first inner edge of said compressible, resilient member in facing relation to the side opening in the main conduit;

a first pair of concentrically spaced O-rings disposed on the first outer portion of said compressible, resilient member about the aperture therein for engaging and forming a double seal with the tapping sleeve;

a second pair of concentrically spaced O-rings disposed on the second inner portion of said compressible, resilient member about the aperture therein for engaging and forming a double seal with the main conduit; and a metal reinforcing ring disposed within said circular member to prevent said circular member from expanding or changing shape in response to the application of a fluid pressure.

2. The branch gasket of claim 1 wherein said reinforcing ring is comprised of stainless steel.

3. The branch gasket of claim 1 wherein said circular member is comprised of an elastomeric compound.

4. The branch gasket of claim 4 wherein said elastomeric compound is styrene butadiene rubber.

5. The branch gasket of claim 1 wherein said hydraulic lip includes first and second flanges disposed in facing relation to the side opening in the main conduit, wherein said first flange engages the tapping sleeve and said second flange engages the main conduit when fluid pressure is applied to the branch gasket.

6. The branch gasket of claim 5 wherein one of said first pair of spaced O-rings is disposed on the first flange of said circular member for engaging the tapping sleeve.

* * * * *